Moore and Patch.
Mower.
Nº 17693.    Patented June 30. 1857
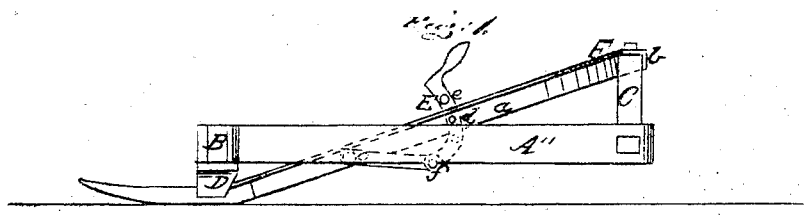
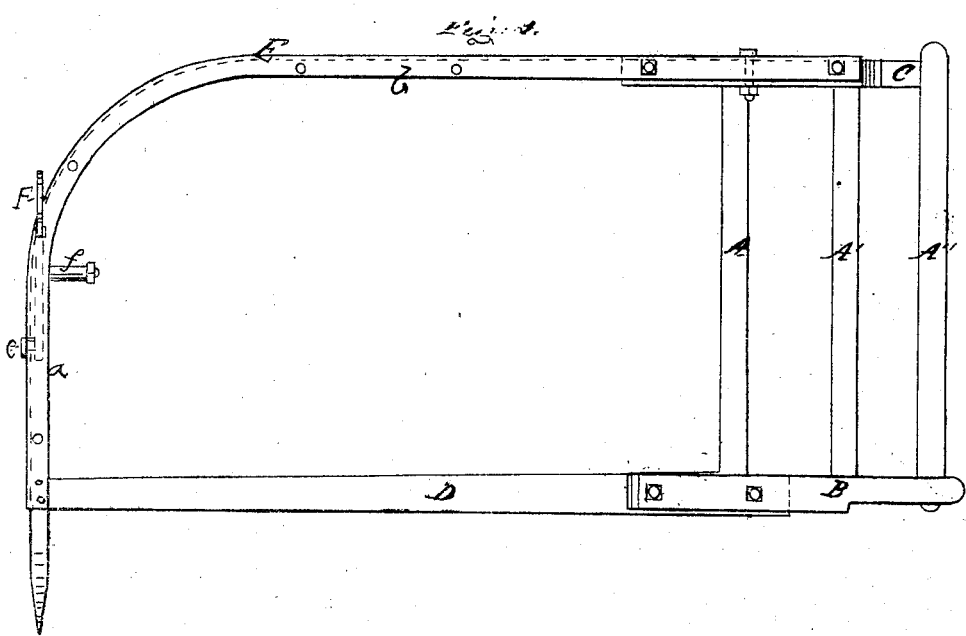

UNITED STATES PATENT OFFICE.

J. A. MOORE AND A. H. PATCH, OF LOUISVILLE, KENTUCKY.

IMPROVED FRAME FOR COMBINED MOWERS AND REAPERS.

Specification forming part of Letters Patent No. 17,693, dated June 30, 1857.

*To all whom it may concern:*

Be it known that we, J. A. MOORE and A. H. PATCH, of Louisville, in the county of Jefferson and State of Kentucky, have invented a new and useful Improvement in the Construction of Grain and Grass Harvesters; and we do hereby declare that the following is a full, clear, and exact description of the same, reference being had to the accompanying drawings, making a part of this specification, in which—

Figure 1 is an end view of our improvement. Fig. 2 is a plan or top view of the same.

Similar letters of reference indicate corresponding parts in the two figures.

To enable those skilled in the art to fully understand and construct our invention, we will proceed to describe it.

A A' A'' represent three wooden bars, the front ends of which are secured to a wooden bar, B, and the back ends to a bar, C. The upper surface of the bar B is flush with the upper surfaces of the bars A; but the upper surface of the bar C extends some distance above the bars A, as shown clearly in Fig. 1. The space between the bars A and A' is rather wider than the space between the bars A' and A'', as shown clearly in Fig. 2.

D represents the finger-bar, which is constructed of a flat or rectangular bar of iron, one end of which is bolted to the under side of the bar B. The finger-bar is in line with the bar B.

E represents an iron bar, which is constructed of a plate bent transversely in angular form, and generally known as "angle-iron." One end of this bar E is bolted to the upper part or surface of the bar C. The bar E extends along parallel with the finger-bar D a certain distance, and is then bent or curved gradually till its outer part, $a$, is at right-angles with its inner part, $b$. The end of the part $a$ is permanently attached to the outer end of the finger-bar D. As the outer end of the finger-bar D is somewhat lower than the upper surface of the bar C the outer part, $a$, of the bar E is inclined, in order that it may be secured to the end of the finger-bar D. The inclination of the part $a$ is clearly shown in Fig. 1.

To the outer part, $a$, of the bar E one end of a curved bar, F, is attached by a pivot, $c$. The opposite end of this bar F passes up through a slot in the part $a$ of the bar E, and a pin, $d$, is fitted transversely in the part $a$ of the bar E, said pin passing through either of a series of holes, $e$, in the bar F. To the bar F, at its inner side, an arm, $f$, is attached, said arm serving as the axis of the wheel at the outer end of the frame. This wheel is not represented in the drawings.

The above-described parts constitute the frame of the machine. That portion of the frame formed of the wooden bars A A' A'' and B C is commonly termed the "main frame," and the driving-wheel is fitted within it. The bar E and finger-bar D support the platform when the machine is used for a grain-harvester, the platform being placed level within the frame, and having its back end supported by hangers attached to the bar E. Neither the platform nor the framing will interfere with the grain, which is raked off the inner end of the platform, between the inner end of the platform and the bar A of the main frame.

By this improvement in the construction of the frame of the machine the frame is made lighter, more durable, and far stronger than that of any combined reaper and mower in present use. The frame has the general form of an oblong square, which is the best form for a combined machine, as it allows the greatest amount or area of clear and unobstructed space behind the finger-bar and cutters, and consequently no obstruction is offered to the cut grass when the platform is removed from the frame and the machine used for a mower. The square form of frame cannot be used successfully in combined machines when made of wood, as they are too cumbersome and heavy. The bar E, in our improvement, gives strength to the frame and renders it compact and uniform.

The machine that is generally considered to be the best combined machine in use has a frame of nearly triangular form. The frame of this machine is strong and reliable; but the machine is not what may be strictly termed a good combined machine, for it will not perform both kinds of work equally well. As a reaper it operates quite well; but it will not work well as a mower in consequence of the frame obstructing the cut grass and carrying said grass along with it, the machine requiring an attendant to rake or keep the grass off the frame.

In our improvement the bar E allows a strong and convenient attachment for the grain-wheel, and as the hub of the wheel can be placed directly below the frame, as shown by the arm $f$, a large grain-wheel may be used—one much larger than can be employed in other machines. We use a grain-wheel two feet in diameter, which is about one-third larger than is or can be used in any other combined machine that is not provided with a separate and additional mowing apparatus.

All harvesters should be combined reapers and mowers, as farmers and planters generally have both grain and grass to harvest.

No change should be required in the frame-work or the finger-bar to adapt the machine to either purpose. The removal or the addition of a light platform should be the only change necessary.

The frame-work should be strong, rigid, and light, in order that the gearing, the cutters, and the several working parts may be kept accurately in their places, and so that the draft may be lessened and the width of cut increased.

The frame should be so arranged that the grain may be delivered in bundles from the platform with the least possible amount of labor.

Combined machines should equal the best mowers when used for mowing and the best reapers when used for reaping.

Our improvement, although simple, presents all the above-named advantages. The angle-iron frame E allows a convenient attachment for the platform, and the grain being discharged between the end of the platform and the main wood frame gives the least amount of work to the forker.

The angle-iron frame E is attached to the rear part of the wood frame about eighteen inches above the level of the finger-bar and cutters, and passes over the bundles of discharged grain freely. When used as a mower the frame E passes over the cut grass, however heavy, without dragging it, the space behind the cutters being free and unobstructed.

With the common "triangular frame," which is made of wood, heavy grass cannot be cut without loading up the frame, as the space behind the cutters is contracted, and the machine which is based upon this plan of frame has to be modified to suit different portions of the country.

We believe our frame to be stronger and more rigid in proportion to its weight than any other yet invented. On account of this lightness and rigidity we can cut with our machine a wider swath than can be cut with any other with the same power.

In the west the farmers want the combined machines to cut a wider swath. Five feet is the ordinary width of cut for two-horse machines. With ours we cut five and a half feet, and in the heaviest grass the draft is light for two horses.

Our frame requires no change to adapt it to any country or to any condition of the crops of grain, grass, or hemp. It is more durable than any other, and is cheaper in proportion to the service it will render. Another important advantage seen in our improvement is that the angle-iron frame E serves to protect the shoe E' at the point of its union with the finger-bar D.

We do not claim making the rear and outer end of the frame in one piece; nor do we claim the indiscriminate use of angle-iron; but

What we claim as new in harvesters, and desire to secure by Letters Patent, is—

Making the rear and outer end of the frame of a combined mower and reaper of a single bar, E, of angle-iron, when said bar E is bent into the form and united to the frame-bars A A C, and to the finger-bar D and shoe E', as described, and shown in the drawings.

J. A. MOORE.
A. H. PATCH.

Witnesses:
E. A. PEARSON,
F. M. LOONEY.